United States Patent [19]

Cameron

[11] Patent Number: 4,689,774
[45] Date of Patent: Aug. 25, 1987

[54] SEISMIC STREAMER SECTION

[75] Inventor: Neil W. Cameron, London, United Kingdom

[73] Assignees: Britoil Public Limited Company, Glasgow; Standard Telephones and Cables Public Limited Company, London, both of England

[21] Appl. No.: 760,578

[22] Filed: Jul. 30, 1985

[30] Foreign Application Priority Data

Aug. 3, 1984 [GB] United Kingdom ............... 8419906

[51] Int. Cl.⁴ ............................................. G01V 1/38
[52] U.S. Cl. ...................................... 367/20; 367/154; 367/130; 174/101.5
[58] Field of Search ..................... 367/20, 18, 15, 130, 367/154, 166, 169, 106; 174/101.5

[56] References Cited

U.S. PATENT DOCUMENTS

| | | | |
|---|---|---|---|
| 3,660,809 | 5/1972 | Pearson | 340/8 S |
| 3,930,254 | 12/1975 | Pavey, Jr. | 340/7 R |
| 3,996,553 | 12/1976 | Siems et al. | 340/15.5 TS |
| 4,005,273 | 1/1977 | Siems | 179/15 BL |
| 4,023,140 | 5/1977 | Siems et al. | 340/15.5 TS |
| 4,031,504 | 6/1977 | Mioduski | 340/15.5 GC |
| 4,031,506 | 6/1977 | Siems | 340/15.5 GC |
| 4,072,923 | 2/1978 | Siems et al. | 340/15.5 TS |
| 4,092,629 | 5/1978 | Siems et al. | 340/15.5 TS |
| 4,160,229 | 7/1979 | McGough | 367/154 |
| 4,319,347 | 3/1982 | Savit | 367/52 |
| 4,388,711 | 6/1983 | Fay | 367/20 |

Primary Examiner—Charles T. Jordan
Assistant Examiner—John W. Eldred
Attorney, Agent, or Firm—Kerkam, Stowell, Kondracki & Clarke

[57] ABSTRACT

A hydrophone section for a seismic streamer towed array in which the hydrophones 2 are arranged in groups of not more than 7, the spacing of the hydrophones within each group being such that each group has an overall length $l = 0.8-1.2$ m. The hydrophone mounts 5 and mechanical spacers 3 are attached at their periphery to aramid fibre strainwires 4. The hydrophone mounts and mechanical spacers are acoustically open structures.

1 Claim, 1 Drawing Figure

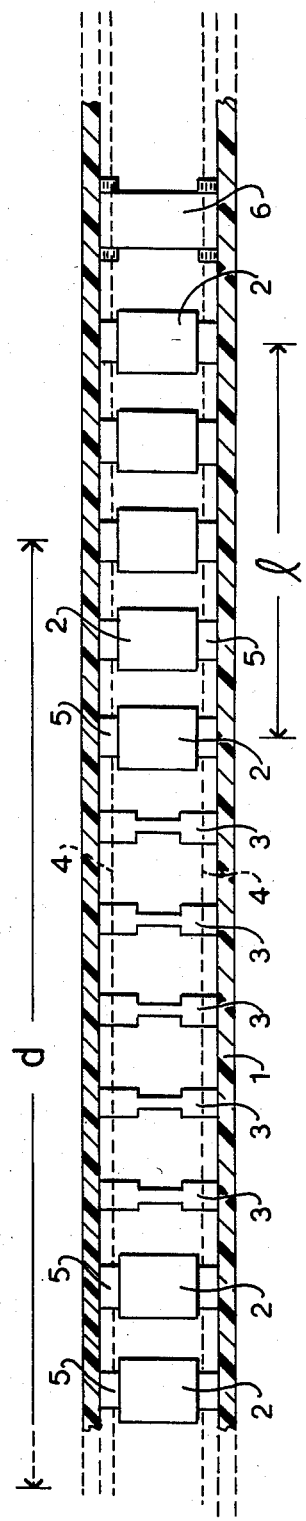

SEISMIC STREAMER SECTION

FIELD OF THE INVENTION

This invention relates to a seismic streamer "section", that is a comparatively long length of a seismic streamer towed array which contains, within a flexible tube or hose, groups of hydrophones. In a digital streamer each section is located between short lengths of the array called "nodes" in which the electronic circuits for the adjoining sections are contained.

A major problem with towed arrays is noise which degrades the performance of the streamer. Different types of noise arise from different sources. There are two main forcing functions which transfer into major noise carrying modes. These are (1) Axial vibration, of which there are two components, namely (a) head and tail input, and (b) residual input;

(2) Turbulent boundary layer (T.B.L.).

Both of these forcing functions excite the two major noise carrying modes, which are (a) breathing waves (hose diameter variation) and (b) hose extension waves. Only the turbulent boundary layer has a convective mode of noise transfer.

DESCRIPTION OF THE RELATED ART

Typical prior art streamer sections comprise groups of 12 hydrophones spaced at 1–1.5 meters, the overall group length being 12–18 meters. These spacings tend to attenuate fast moving noise, i.e. sound waves in water.

Axial vibrations, e.g. thrumming noise from the tow cable and tail rope, can be attenuated by the use of vibration isolation sections. One such isolation section is inserted between the leading section or node of the towed array and the tow cable from the ship. Another isolation section is inserted between the last section of the array and the tail rope trailed behind the array to provide stability in the array during towing. Residual noise inputs on the hose itself, e.g. surface discontinuities at joints between sections and nodes, are reduced by careful attention to the design of the hose junctions so that as smooth a profile as possible is achieved. However, even with measures such as these noise still remains an important factor in the performance of a towed array.

SUMMARY OF THE INVENTION

According to the present invention there is provided a hydrophone section for a seismic streamer towed array comprising a flexible outer hose, a plurality of hydrophones in supports disposed along the interior of the hose together with a number of mechanical spacer elements, the hydrophone supports and spacer elements being attached to strainwires which are anchored at each end of the section in the bulkheads, the remaining space within the hose being filled with a fluid, characterised in that the strainwires are constructed of substantially non-elastic low extension aramid fibres the breaking strain of which is approximately 7–10 times the normal strain imposed by towing forces, and the hydrophone supports and spacer elements having an acoustically open construction, whereby the effects of the axial vibration to noise carrying modes are attenuated.

In a preferred embodiment of the invention the hydrophones in each section are arranged in groups of not more than 7, the spacing of the hydrophones within each group being such that each group is overall 0.8–1.2 m in length.

BRIEF DESCRIPTION OF THE DRAWING

An embodiment of the invention will be described with reference to the accompanying drawing which illustrates diagrammatically the construction of a seismic streamer section.

DESCRIPTION OF THE PREFERRED EMBODIMENT

The section comprises an outer hose 1, e.g. of polyvinylchloride or polyurethane, within which there are groups of hydrophones 2 and spacer elements 3 attached to strainwires 4. The strainwires 4 are anchored in bulkheads 6 at each end of the section. The strainwires are typically made of aramid fibres either in a braided rope construction or in a simple stranded construction. The high modulus aramid fibre strainwires are chosen to have a high vibrational impedance to reduce the transfer function for axial vibration to noise carrying modes. The hydrophones 2 are centrally mounted within the hose 1 by means of hydrophone mounts 5 which are annular structures with open spaces around the hydrophones. The mounts 5 are attached at their periphery to the strainwires 4. Likewise the spacer elements 3 are open annular structures attached at their periphery to the strainwires. The spacer elements are dimensioned such that they are a close fit within the hose 1. The choice of hose material, i.e. with a high dynamic modulus, coupled with the use of a low viscosity further filler fluid and a low profile interior, achieved by design of the spacer and hydrophone mounts, reduces residual vibration.

The turbulent boundary layer transfer function to the main noise carrying modes can be reduced by utilising the same techniques. However, it should be noted that reducing these transfer functions conflicts with the attenuation of the noise carrying modes, namely in the choice of hose wall. So a careful compromise must be made to produce a low noise environment for the hydrophones.

The hydrophones are grouped in groups of 5 at approximately 300 mm spacing, the overall length l of the group being 1200 mm. The groups may be arranged at intervals d of e.g. 3 m. The spacer elements are interspaced centrally between the hydrophones. This spacing (300 mm) is continued for the spacers between the hydrophone groups. When the entire section has been assembled between bulkheads which seal the hose ends the section is filled with a low viscosity filler, e.g. a fluid such as Kerosene. The hydrophone grouping and axial spacing is designed to combat slow moving noise sources in the hose structure rather than the fast moving noise sources such as sound waves in the sea water.

I claim:

1. A hydrophone section for a seismic streamer towed array comprising:

a flexible outer hose;

bulkheads at each end of the section;

strainwires anchored at each end of the section in said bulkheads, the strainwires comprising non-elastic low extension aramid fibres, the breaking strain of which is 7–10 times the normal strain imposed by streamer towing forces;

a plurality of hydrophones in hydrophone mounts disposed along the interior of the hose in groups;

mechanical spacer elements disposed within the hose between said hydrophone groups;

said mounts and spacer elements being constructed as open annular structures attached at their periphery to said strainwires, the remaining space within the hose being filled with a low viscosity fluid; and the hydrophones numbering not more than 7 in each group, the overall length of each group being between 0.8 and 1.2 m and the groups being arranged at intervals of approximately 3 m, the spacing of the hydrophones in each group and of the spacer elements between the groups being substantially the same.

* * * * *